Oct. 26, 1965 T. M. DAUPHINEE 3,214,527
MULTIPLE ELECTRIC SWITCH FOR USE WITH PRECISION
MEASURING INSTRUMENTS
Filed Aug. 3, 1962 3 Sheets-Sheet 2

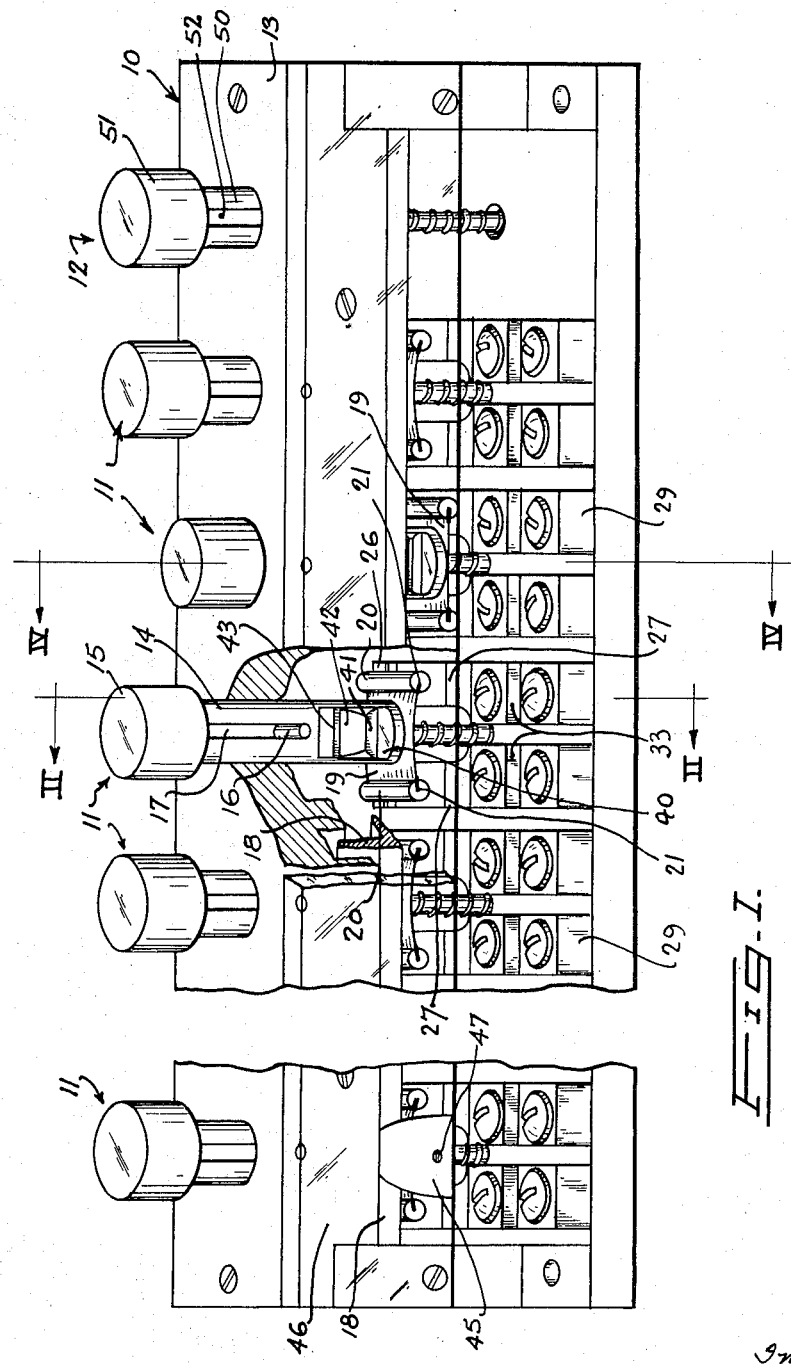
Fig. I.

Inventor
Thomas M. Dauphinee
By Cushman, Darby & Cushman
Attorneys

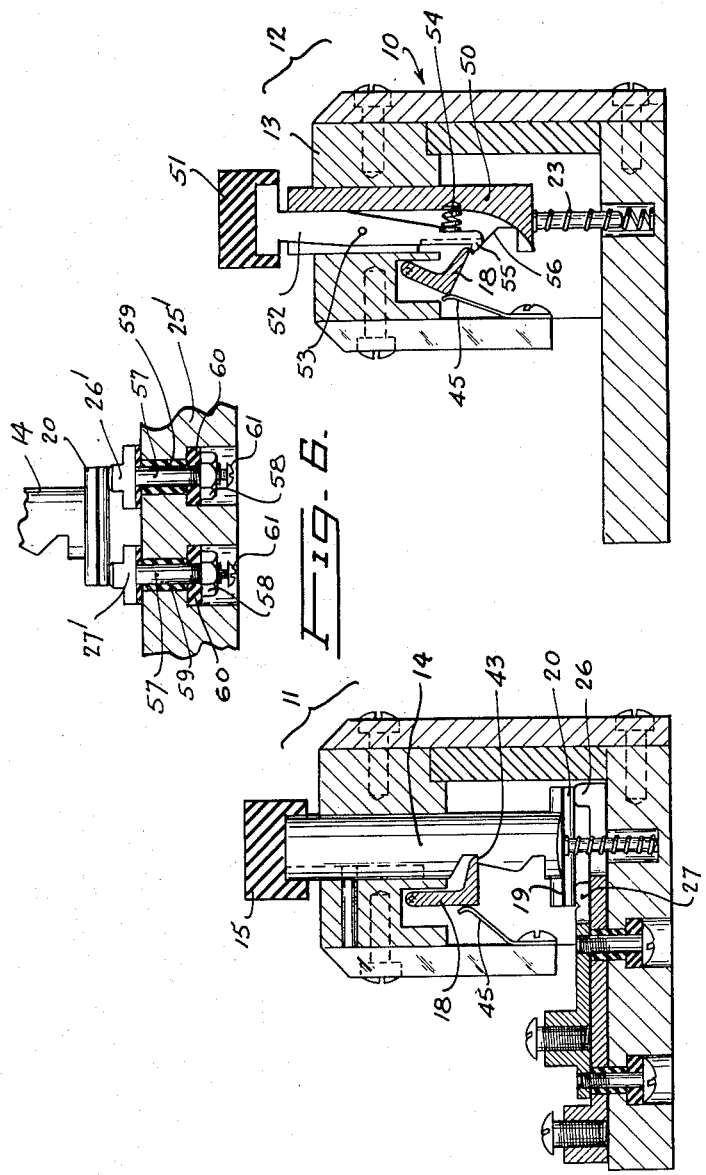

United States Patent Office 3,214,527
Patented Oct. 26, 1965

3,214,527
MULTIPLE ELECTRIC SWITCH FOR USE WITH PRECISION MEASURING INSTRUMENTS
Thomas M. Dauphinee, 8 Bristol Ave., Ottawa, Ontario, Canada
Filed Aug. 3, 1962, Ser. No. 214,580
9 Claims. (Cl. 200—5)

This invention relates to an electric switch designed for use with precision laboratory instruments, such as potentiometers, and the primary object of the invention is the provision of a switch construction that will exhibit reliability of performance, reasonably low and constant resistance, and very low internally generated thermal E.M.F.'s.

The highly sensitive galvanometers employed with modern precision measuring instruments will detect E.M.F.'s down to the level of one hundredth of a microvolt, at which level even some minor asymmetry of construction in the switch or a comparatively small thermal E.M.F. set up in the switch can significantly upset the accuracy of measurement when the switch is used to connect the galvanometer to the remainder of the bridge or other balanced circuit.

It is the minimisation of these difficulties that is the principal object of the present invention. Moreover, it is desired to achieve this object as far as possible without resorting to precision manufacturing methods and without the use of noble metals for the contact surfaces. Hitherto, in switches used for high precision work, it has been customary to form the contacts of gold to avoid oxidation of contacts, but the use of gold requires special care in manufacture and necessitates the use of highly skilled workers. Moreover, the use of gold gives rise to difficulty with thermal E.M.F.'s, since gold requires a greater time to achieve thermal equilibrium than copper. A further object of the present invention is thus the construction of a swtich in which precision manufacturing techniques can be avoided, and in which the contacts can be made of copper, yet without sacrifice in the perfomance of the switch in the respects already mentioned, namely uniformity of conductivity and minimisation of thermal E.M.F.'s.

The manner in which the invention may be carried into practice is illustrated by way of example in the accompanying drawings.

FIGURE 1 is a perspective front view, seen slightly from above, of a device incorporating a bank of switches constructed in accordance with the invention;

FIGURE 4 is a transverse section on the plane IV—IV in FIGURE 1, showing the position occupied by the parts when a switch has reached the closed position;

FIGURE 5 is a transverse section through the release mechanism, showing the parts thereof in depressed position; and FIGURE 6 is a fragmentary section illustrating an alternative manner of mounting the fixed contacts.

Figure 3:
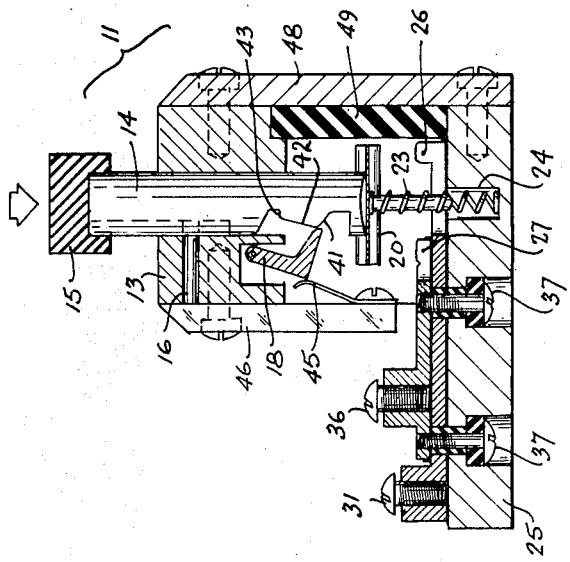
FIGURE 3 is a view similar to FIGURE 2 showing the manner of operation of the parts as a button is depressed towards switch-closing position.

The construction shown in FIGURE 1 consists of a housing 10 containing a bank of switches 11 and a single release mechanism 12. The switches 11 are identical to each other and for consideration of their detailed structure reference should also be made to FIGURE 2. Slidingly mounted in vertical holes in the upper member 13 of the housing 10, are operating members 14, each of which has secured to its outer end a conventional insulating push button 15 designed for manual operation. Pins 16 extending through the member 13 engage grooves 17 in the rods 14 to avoid rotation of the latter. This is necessary because the lower part of each member 14 is machined on one side for cooperation with a locking bar 18. Alternatively, the members 14 could be machined symmetrically all around, by turning, in which case the pins 16 could be dispensed with.

Secured to each operating member 14 near its lower end is a thin resilient steel plate 19, such plate being slightly bowed but lying generally in a horizontal plane transverse to the axis of member 14. Each plate 19 extends to both sides of its associated member and carries along each of its lateral edges a circular copper rod 20, which thus forms an elongated rigid contact member which is insulated from the plate by an interposed layer of thin vinyl plastic 21. The lowermost portion 22 of each operating member 14 is of reduced diameter and extends through a central hole in the plate 19 to act as a support for a coil spring 23; one end of this spring bears against the underside of the plate 19 while the other end is seated in a cavity 24 in the base 25 of the housing 10.

Rods 20 constitute a pair of movable bridging contacts, each of which cooperates with a pair of fixed contacts 26 and 27 (see the closed position of FIGURE 4). Whereas the rods 20 are cylindrical, the fixed contacts 26 and 27 are formed with flat contact faces, these faces lying in a common plane transverse to the axis of member 14. The front and rear edges of the faces of contacts 26 and 27 are chamfered, as at 28.

Each contact 26 is formed on the end of an elongated copper terminal member 29 which extends outwardly of the casing 10 to portion 30 carrying a screw 31. Each terminal member 29 extends along the upper surface of the base 25, with a layer of thin vinyl plastic insulation 32 interposed therebetween, a second elongated copper terminal member 33 being further superimposed thereon, again with an interposed layer 34 of vinyl insulation. Such upper terminal member 33 has the corresponding fixed contact 27 formed on one end, and a thickened portion 35 with screw 36 formed near its other end. These terminal members 29 and 33 are secured to the base 25 by screws 37 which engage the upper terminal member 33, being insulated from the lower terminal member 29 and the base 25 by insulating sleeves 38 and washers 39. This assembly is repeated twice for each switch, each switch having two independent poles, and all the assemblies so formed along the casing 10 are separate and independent of each other.

The front face of each operating member 14 is machined to form a series of depressions therein. In sequence, starting near the plate 19 and working upwards, these depressions define an upwardly facing ledge 40, a downwardly and outwardly facing camming surface 41, an outwardly and slightly upwardly facing sliding surface 42, and an upwardly facing ledge 43. These surfaces are arranged for cooperation with the foot of the angled locking bar 18 which is common to the various switches and extends the full length of the casing 10. Such bar 18 is pivotally mounted on pins 44 and is urged towards the operating members 14 by a leaf spring 45 secured to the transparent front face 46 of the casing 10 by a screw 47.

Figure 2:
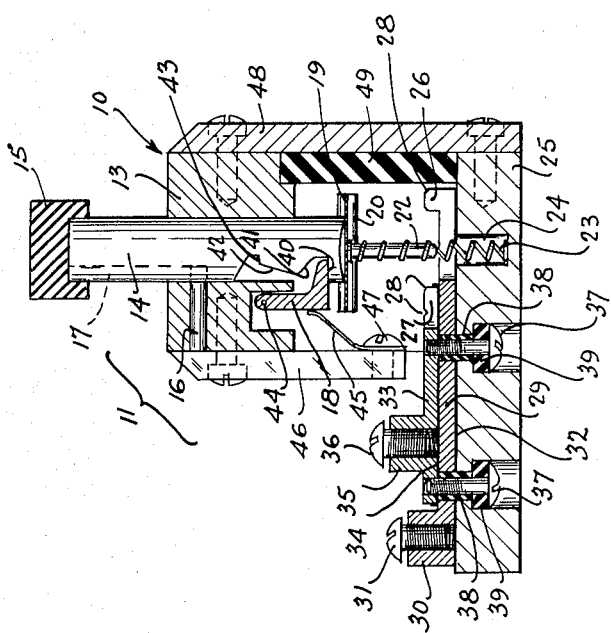
FIGURE 2 is a transverse section on the plane II—II in FIGURE 1, showing a switch in open position.

The structure shown in FIGURE 2 is completed by a casing back 48 and an insulating lining member 49. The casing back 48 is preferably made of a metal having high thermal conductivity to transmit heat between the top and bottom of the assembly and thus improve thermal equilibrium.

FIGURE 2 shows the position of the parts of a typical switch 11 when in open position. Manual depression of the push button 15, the effect of which is demonstrated by FIGURE 3, moves the operating member 14 downwardly against the action of spring 23. Camming surface 41 forces the locking bar outwardly against its spring 45, thus releasing any other operating member 14 that may have been previously locked down by the bar 18 in switch-closed position. This release operation will appear more clearly as the description proceeds.

Until this point in the operation of the switch, the spring 45 has assisted the spring 23 in resisting downward movement of the operating member 14. However, once the outermost point of camming surface 41 has passed the edge of the locking bar 18 against which it bears, this added resistance to downward movement of member 14 disappears. In fact, the spring 45 may slightly assist such downward movement during the time that the locking bar 18 bears against the sliding surface 42. In any event, the resistance to travel is suddenly reduced, which has the effect of causing the substantial pressure which the operator has by now found it necessary to apply to the push button 15, to bring the parts rapidly and unhesitatingly to the switch-closed position shown in FIGURE 4, with the two rods 20 secured to the edges of the plate 19 each bridging a pair of fixed contacts 26 and 27.

The continued momentum of travel of the operating member 14 and its associated parts causes these to move momentarily past the final switch-closed position to the small extent necessary to permit the locking bar 18 to engage the ledge 43. During this movement, and subsequently when the parts have reached the static position of FIGURE 4, the necessary resiliency is imparted to the system by the springy steel plate 19. It is the resiliency of this plate 19 that provides the necessary contact pressure between rods 20 and fixed contacts 26 and 27, as can best be appreciated from a comparison between the slightly convexly bowed form of the plates 19 (as seen from above in FIGURE 1) when unstressed in switch-open position, and the substantially flat form of the plate 19 of the switch shown closed in FIGURE 1. This transition of the plate 19 from unstressed to stressed condition, which takes place whenever a switch is closed (and from stressed to unstressed when the switch is opened) involves an arcuate movement of each rod 20 and consequently produces a wiping of each rod 20 over its associated fixed contacts 26 and 27. This wiping action will have a cleaning effect on the contacts every time the switch is opened or closed and will accordingly materially assist in maintaining uniformity of contact conductivity. The latter is also assisted by the preferred shaping adopted for the contacts with a cylindrical contact (rod 20) rubbing against and finally making contact with flat faced contacts (fixed contacts 26 and 27). Another suitable shape combination is a pair of cylinders at right angles. To achieve this effect, the fixed contacts 26 and 27 would be curved about horizontal axes extending along the housing from one end to the other. This alternative can be adopted, if desired. It makes the contact area quite small, which improves contact pressure and enhances the cleaning effect.

Normally, each switch will be opened by the closing of one of the other switches. As was pointed out above, when any one of the operating members 14 is depressed, its camming surface 41 pushes back the locking bar 18 which is thus withdrawn from the ledge 43 of any operating member 14 that may have been held down by such bar. Closure of any one switch will thus automatically release any other switch previously held in closed position.

In the event that it is desired to release a closed switch without closing another switch, the release mechanism 12 is used. This release mechanism, which is shown in FIGURE 5 and at the right hand end of FIGURE 1, consists of an operating member 50 slidingly mounted in the upper member 13 of the housing 10, a push button 51 being connected to this operating member 50 by the intermediary to a latch member 52 which is pivoted by a pin 53 to the operating member 50 and carries the push button 51. A spring 54 holds the lower end of the latch member 52 in an outward position. As in the case of the operating members 14, the operating member 50 is urged outwardly of the housing 10 by a spring 23. The lower end of the latch member 52 is formed as an outwardly facing hook 55 for engagement with the locking bar 18, and the portions of the operating member 50 on each side of the latch member 52 and below the hook 55 are formed with camming surfaces 56 similar to the camming surface 41.

When the locking bar 18 is to be moved to release one switch without closing another switch, the push button 51 is employed to depress the operating member 50. The camming surfaces 56 push the bar 18 back, thus releasing the closed switch. During this movement the hook 55 becomes engaged with the bar 18 and the parts take up the position seen in FIGURE 5, in which the bar 18 is held back and the operating member 50 is held down. While this position is maintained, none of the switches 11 can be locked in closed position, since the locking bar 18 is held just out of contact with any of the operating members 14. When the release mechanism 12 is itself to be released, the operator moves the push button 51 forward to pivot the latch member 52 anticlockwise and thus withdraw the hook 55 from locking bar 18 and allow the spring 23 to return the operating member 50 to projecting position.

As has been explained, one of the principal objects of the invention is to reduce thermal E.M.F.'s as far as possible, for which purpose all the conducting members and contacts are made of copper. There are thus no dissimilar metals in contact with each other. Furthermore, temperature differentials are kept as low as possible. By arranging the terminal members 29 and 33 in proximity to each other and hence in close thermal contact with each other (while being sufficiently electrically insulated from each other) any tendency for temperature differentials to be set up is minimised, and the temperature gradients in each terminal member are alike, thus being substantially equal and opposite in the circuit on each side of the bridging contact. The present arrangement has provided a continuous rigid all-copper circuit embodied in a construction that is robust and comparatively easy to manufacture without the need to employ precision manufacturing methods. Moreover it has provided an arrangement that affords contact wiping on opening and closing, combined with uniform contact pressure as provided by the resilient steel plates 19. In this connection it is pertinent to note that no current passes through the steel plates 19. This feature avoids the difficulty that would otherwise result from the fact that pure copper and spring copper are not the same thermoelectrically. The absence of a flexing conductor thus avoids the circuit extending through dissimilar metals.

An alternative arrangement for the fixed contacts is illustrated in FIGURE 6 which shows a fragment of a modified housing base 25' in which copper fixed contacts 26' and 27' formed integrally on copper pins 57 are secured by nuts 58, insulating sleeves 59 and washers 60 being interposed. Screws 61 engage the ends of pins 57 to permit a conductor to be clamped into contact with the pin. By making the base 25' of a material of high thermal conductivity, copper or aluminum, the temperatures of contacts 26' and 27' can be kept substantially equal.

As will be apparent, the basic aspects of the present invention are equally applicable to any switch, whether it be double or single pole. Thus each plate 19 or its equivalent, need carry only a single bridging contact, but the symmetry of the double-sided spring is preferred, as it results in balanced forces and avoids torque on the operating members, from which smoother operation results. The double pole arrangement is also preferred as representing a considerable assembly and construction convenience.

In addition, it is not essential that a bank of such switches be mounted together in a common housing, although it is convenient to do so for many practical applications in the precision measuring field.

I claim:
1. An electric switch comprising first and second spaced apart fixed contacts of a conducting material, an operating member, means mounting said operating member for movement between a switch-open and a switch-closed position, means urging said operating member to switch-open position, means for retaining said operating member in switch-closed position, a resilient plate, means securing said plate to said operating member to project therefrom, an elongated rigid contact member of said conducting material, said contact member being mounted on said plate remote from said operating member and lying in spaced relation from said fixed contacts in the switch-open position, said contact member engaging and bridging said fixed contacts in the switch-closed position to complete a conducting path entirely of said conducting material through said first fixed contact, said rigid contact member and said second fixed contact, said switch-closed position being such that, on movement of said operating member into the switch-closed position, said resilient plate is flexed by engagement of said contact member with said fixed contacts whereby to cause said contact member to wipe over said fixed contacts and to establish contact pressure therewith.

2. An electric switch comprising first and second spaced apart fixed contacts of a conducting material, an operating member, means mounting said operating member for movement between a switch-open and a switch-closed position, means urging said operating member to switch-open position, means for retaining said operating member in switch-closed position, a resilient plate, means securing said plate to said operating member to project therefrom, an elongated rigid contact member of said conducting material and having generally cylindrical contact surfaces; said contact member being mounted on said plate remote from said operating member and being electrically insulated from said plate, said contact member lying in spaced relation from said fixed contacts in the switch-open position, said contact member engaging and bridging said fixed contacts in the switch-closed position to complete a conducting path entirely of said conducting material through said first fixed contact, said rigid contact member and said second fixed contact, said switch-closed position being such that, on movement of said operating member into the switch-closed position, said resilient plate is flexed by the engagement of said generally cylindrical contact surfaces with said fixed contacts whereby to cause said contact surfaces to wipe over said fixed contacts and to establish contact pressure therewith.

3. An electric switch comprising: a pair of terminal members of a conducting material, fixed contacts also of said conducting material formed one on each terminal member and being spaced apart one from the other, said terminal members being electrically insulated from each other and extending outwardly of the switch in proximity to each other and in close thermal contact with each other to minimize any temperature differentials between said terminal members and between said contacts; an operating member; means mounting said operating member for movement between a switch-open and a switch-closed position; means urging said operating member to switch-open position; means for retaining said operating member in switch-closed position; a resilient plate; means securing said plate to said operating member to project therefrom; an elongated rigid contact member of said conducting material and having generally cylindrical contact surfaces, said contact member being mounted on said plate remote from said operating member and being electrically insulated from said plate, said contact member lying in spaced relation from said fixed contacts in the switch-open position, said contact member engaging and bridging said fixed contacts in the switch-closed position to complete a conducting path entirely of said conducting material between said terminal members through said fixed contacts and said rigid contact member, said switch-closed position being such that, on movement of said operating member into the switch-closed position, said resilient plate is flexed by the engagement of said generally cylindrical contact surfaces with said fixed contacts whereby to cause said contact surfaces to wipe over said fixed contacts and to establish contact pressure therewith.

4. An electric switch according to claim 3 wherein said resilient plate extends on both sides of said operating member and carries a second elongated contact member opposite said first mentioned contact member and similar thereto, said second contact member also being electrically insulated from said plate and cooperating with a second pair of spaced apart contacts similar to said first pair of spaced apart contacts whereby to form a double pole switch.

5. An electric switch according to claim 4 wherein said conducting material is non-spring copper and said resilient plate is spring steel.

6. An electric switch comprising:
(a) a generally cylindrical operating member having first and second retaining surfaces and first and second camming surfaces,
(b) said operating member being mounted for axial movement in a first operating direction to a switch-closed position and in a second operating direction opposite to said first operating direction to a switch-open position,
(c) spring means biasing said operating member axially in said second operating direction,
(d) said first retaining surface facing in said second operating direction, said first camming surface extending from said first retaining surface and facing generally in a direction between said first operating direction and a direction transverse to said first operating direction, said second camming surface forming a continuation of said first camming surface and facing generally in a direction between said second operating direction and said transverse direction, said first and second camming surfaces forming between them a high point in said transverse direction, said second retaining surface extending from said second camming surface and facing in said second operating direction,
(e) a retaining member spaced from said operating member in said transverse direction, said retaining member being biased toward said operating member to engage said first retaining surface when said operating member is in switch-open position and to engage said second retaining surface when said operating member is in switch-closed position to retain said operating member in switch-closed position, said retaining member engaging said first and then said second camming surfaces during movement of said operating member in said first operating direction from switch-open to switch closed position; the engagement of said retaining member with said first camming surface tending to oppose movement of said operating member in said first operating direction to a substantially greater extent than engagement of said retaining member with said second camming surface,
(f) a resilient plate, said plate being mounted on said operating member to project transversely of the axis thereof at a position spaced axially in said first operating direction from said first retaining surface,
(g) a generally cylindrical straight contact member of a conducting material, said contact member being mounted on said plate remote from said operating member and being electrically insulated from said plate,
(h) a pair of spaced apart fixed contacts of said conducting material having contact faces lying in a common plane, said cylindrical contact member when in switch-open position lying at a predetermined distance from said contact faces as determined by the engagement of said retaining member with said first retaining surface, and engaging and bridging said contact faces when in switch-closed position, (i) the distance between said first retaining surface and said second retaining surface being greater than said predetermined distance whereby upon movement of said operating member to switch-closed position, said resilient plate is flexed by engagement of said contact member into said contact faces to cause said contact member to wipe over said contact faces and establish contact pressure therewith, (j) the axial distance between said second retaining surface and said high point being at least equal to the axial distance between said first retaining surface and said high point, whereby when a predetermined force is applied to said operating member to cause movement thereof to switch-closed position, said operating member will move with a speed dependent upon said force and upon the resistance to movement caused by said spring means (c) and by the engagement of said retaining member with said camming surfaces, and said resistance to movement will decrease as said high point passes said retaining member so that said speed will substantially increase for a rapid establishing of said contact pressure.

7. An electric switch according to claim 6 including a pair of terminal members of said conducting material, said fixed contacts being formed on said terminal members, said terminal members being electrically insulated from each other and extending outwardly of the switch in proximity to and in close thermal contact into each other to minimize any temperature differentials between said terminal members and between said contacts.

8. An electric switch according to claim 7 wherein said resilient plate extends on both sides of said operating member and carries a second elongated contact member opposite said first mentioned contact member and similar thereto, said second contact member also being electrically insulated from said plate and cooperating with a second pair of spaced apart contacts similar to said first pair of spaced apart contacts whereby to form a double pole switch.

9. An electric switch according to claim 8 wherein said conducting material is non-spring copper, said resilient plate being spring steel, and said terminal members are separated from each other by a thin layer of plastic insulation.

References Cited by the Examiner
UNITED STATES PATENTS

| | | | |
|---|---|---|---|
| 1,336,066 | 4/20 | Briggs | 200—166 |
| 1,979,588 | 11/34 | Vreeland. | |
| 2,847,529 | 8/58 | Munn | 200—166 X |

BERNARD A. GILHEANY, *Primary Examiner.*